US005373274A

United States Patent [19]

Belica et al.

[11] Patent Number: 5,373,274

[45] Date of Patent: Dec. 13, 1994

[54] DEFLECTION YOKE WITH ANTI-RINGING WINDING CORE SLOTS

[75] Inventors: Roddy Belica, Cicero; Thomas J. Babula, Lake Villa, both of Ill.

[73] Assignee: Academy Electronic Tube, Incorporated, Bensenville, Ill.

[21] Appl. No.: 110,542

[22] Filed: Aug. 23, 1993

[51] Int. Cl.[5] .......................... H01H 1/00; H01J 1/15; H01J 29/70; H04N 5/645

[52] U.S. Cl. .................................... 335/213; 313/440; 313/343; 348/829; 29/605; 140/71.5

[58] Field of Search ................ 335/210, 213; 313/343, 313/440; 358/248; 140/71.5

[56] References Cited

U.S. PATENT DOCUMENTS

| | | | |
|---|---|---|---|
| 4,754,248 | 6/1988 | Belica | 335/210 |

FOREIGN PATENT DOCUMENTS

| | | | |
|---|---|---|---|
| 0307104 | 3/1989 | European Pat. Off. | 313/440 |
| 0100342 | 6/1985 | Japan | 313/440 |
| 62-93840 | 4/1987 | Japan | 313/440 |
| 0233834 | 2/1990 | Japan | 313/440 |
| 3149734 | 6/1991 | Japan | 313/440 |
| 4129138 | 4/1992 | Japan | 313/440 |

*Primary Examiner*—Leo P. Picard
*Assistant Examiner*—Stephen T. Ryan
*Attorney, Agent, or Firm*—Lockwood, Alex, FitzGibbon & Cummings

[57] ABSTRACT

A deflection yoke for use with cathode ray tubes of the type in which one or more electron beams generated therein are deflected includes a magnetic core member and a selected wire winding thereon to produce a magnetic field for deflecting the beam. Each core has a winding axis defined thereon and each winding occurs along at least one segment having a given length along the winding axis. Each segment has a first end and an opposed second end and a middle portion defined therebetween. The winding pattern of each winding in accordance with the invention begins in the central portion of each segment and includes a first toroidal winding portion starting at this midpoint and extending in a first handed direction to a first segment end. The winding pattern includes an intermediate transition portion which extends from the first segment end to the second segment end. The winding pattern continues with a second toroidal winding portion extending from the second segment and to the middle starting point. It has now been discovered that by providing a conductive wire winding on the ferrite core which follows a helical path about a winding axis along the core, and which follows a winding pattern beginning in the middle portion of each winding segment and which is laid up to intentionally include certain wire crossovers, an improved CRT display raster characterized by reduced distortion and reduced ringing is provided.

1 Claim, 3 Drawing Sheets

DEFLECTION YOKE WITH ANTI-RINGING WINDING CORE SLOTS

BACKGROUND OF THE INVENTION

The present invention generally relates to deflection yokes, and in particular, to deflection yokes for use with monochrome or color television receivers, wherein vertical deflection windings are toroidally wound on a ferrite core in a manner which substantially reduces or eliminates undesirable ringing and other unwanted distortion phenomena.

In conventional monochrome and color television receivers, a cathode ray tube (CRT) is provided with a deflection yoke assembly for deflecting electron beams generated within the CRT to produce a display raster. In the case of color television receivers, the deflection yoke performs the additional function of converging the beams provided by three separate electron guns. Typically, deflection yoke assemblies include a frusto-conical ferrite core dimensioned to surround the relatively narrow neck portion of the CRT which joins the flared portion of the tube envelope. Frequently, the deflection yoke includes a pair of diametrically opposed toroidally wound windings on the ferrite core for causing vertical deflection of electron beams, while a pair of saddle-shaped windings disposed between the interior surface of the core and the external surface of the envelope, provide horizontal deflection of the beam. As the quality of the display is greatly affected by the configuration and location of the deflection windings, much effort has been expended in developing winding distributions which provide displays of superior quality.

Since the path distances travelled by individual electrons of the electron beam vary according to the location on the screen to which the beam is directed, use of uniform magnetic deflection fields results in a distorted raster. Accordingly, non-uniform fields are used to obtain a non-distorted raster. Such non-uniform fields are produced by altering the shape of the deflection windings, as well as, the distribution of turns within individual windings. Cosine windings, wherein the turns density varies according to the cosine of an angle, constitute one form of distribution frequently used. Other winding distributions may also be used.

Once an acceptable winding distribution has been identified, it is necessary for a deflection yoke manufacturer to develop a method for accurately and economically reproducing the desired distribution over a large quantity of cores. One technique developed for this purpose is to attach plastic rings having notches, ridges, or pins to either or both edges of the ferrite core. The windings overlap the rings, which serve to maintain the position of the windings relative to the core. The technique is attractive, particularly where the winding distribution is complex, since it is relatively easy to accurately mold a great number of precisely dimensioned notches in the plastic rings. However, the additional manufacturing steps required undesirably increases manufacturing costs.

The invention described in commonly assigned U.S. Pat. No. 4,754,248 overcomes the disadvantages of prior techniques by directly providing at selected locations on the ferrite core a number of notches of preselected depth and width. In winding the deflection windings of the yoke, wire is placed on the core so that each notch is filled before winding commences on the next adjacent notch. The technique of forming notches directly on the core avoids the economic disadvantage associated with the installing plastic rings, and the relatively large dimension of each notch avoids the difficulty associated with accurately forming a large of number of small precisely dimensioned notches directly in the core, since dimensional changes resulting from shrinkage of the core during firing after casting are less significant with relatively larger notches.

The present invention in its broadest aspects relates to the discovery that by providing a conductive wire winding on the ferrite core which follows a helical path about a winding axis along the core, and which follows a winding pattern beginning in the middle portion of each winding segment and which is laid up to intentionally include certain wire crossovers, an improved display characterized by reduced distortion and reduced ringing is provided. Contrary to the prior art, which maintained that a linear wire winding pattern which avoided wire crossovers, provides windings having lower inter-wire capacitance and therefore improved display characteristics, it is now been discovered that improved anti-ringing performance is provided by a center-start, crossover switchback winding pattern which intentionally includes non-linear winding patterns on both notched and unnotched cores.

Accordingly, it is a general object of the present invention to provide a new and improved deflection yoke for use with cathode-ray tubes.

Another object of the invention is to provide a deflection yoke which is economical to manufacture and which is characterized by superior anti-ringing performance.

SUMMARY OF THE INVENTION

A deflection yoke for use with cathode ray tubes of the type in which one or more electron beams generated therein are deflected includes a magnetic core member and a selected wire winding thereon to produce a magnetic field for deflecting the beam. Each core has a winding axis defined thereon and each winding occurs along at least one segment having a given length along the winding axis. Each segment has a first end and an opposed second end and a middle portion defined therebetween. The winding pattern of each winding in accordance with this invention begins in the central portion of each segment and includes a first toroidal winding portion starting at this midpoint and extending in a first handed direction to a first segment end. The winding pattern includes an intermediate transition portion which is generally not toroidally wound, which extends from the first segment all the way to the second segment end. The winding pattern then resumes with a second toroidal winding portion extending in the same direction of hand from the second segment and to the middle starting point. This winding pattern may be linearly, serially repeated from one segment to the next adjacent segment, and from one notch to another adjacent notch on said core, as in the preferred embodiment wherein the notches define the segments along the core winding axis. Moreover, the winding pattern may be repeated to provide multiple layers at each segment as desired.

Although any number of segments may be used., it has been discovered that cores having four segments per core half for black and white and four or more segments per core half for color monitoring are preferred. Furthermore, windings including a plurality of winding layers may be provided as desired. The number of turns or coil rotations in each segment layer may also vary as required to match a given inductance as desired.

Other objects and advantages of the present invention will become apparent from the following detailed description taken in conjunction with the drawings, in which:

DETAILED DESCRIPTION OF THE PREFERRED EMBODIMENTS

Figure 1:
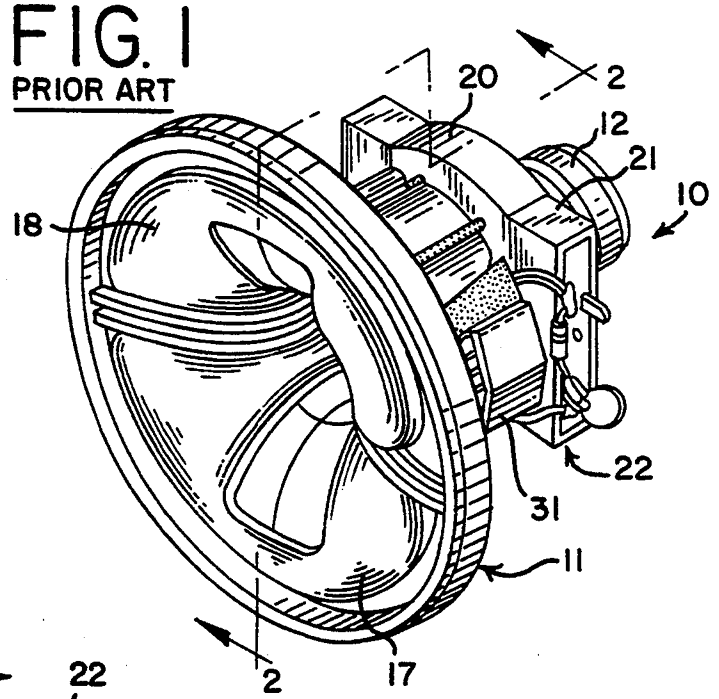
FIG. 1 PRIOR ART
FIG. 1 is a perspective view of the deflection yoke incorporating a ferrite core and winding constructed with accordance with the present invention.
Figure 2:
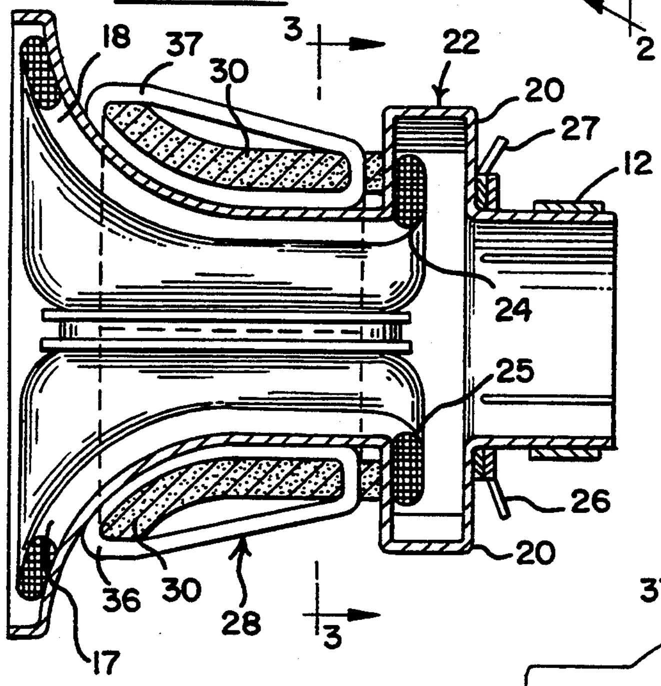
FIG. 2 PRIOR ART
FIG. 2 is a cross-sectional view of the deflection yoke shown in FIG. 1 taken along lines 2—2 therein.
Figure 3:
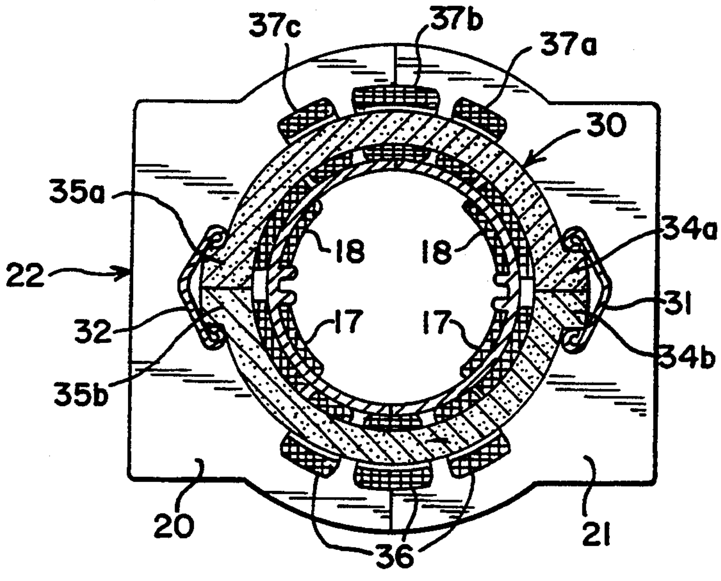
FIG. 3 PRIOR ART
FIG. 3 is a cross-sectional view of the deflection yoke shown in FIG. 2, taken along lines 3—3 thereof.

Referring to the Drawings, and in particular to FIGS. 1–3, a deflection yoke 10 for use with a cathode ray tube (CRT) such as may be utilized in the conventional monochrome television receiver or video monitor is illustrated. Deflection yoke 10 includes a generally funnel-shaped frame 11 fashioned from molded plastic or similar insulating non-magnetic material, which is dimensioned to encircle the neck of a CRT (not shown) where it joins the flared portion of the tube envelope. In use, the deflection yoke 10 is placed over the neck of the CRT with its relatively larger diameter end toward the display screen. The yoke is held in position by means of a compression ring and bolt (not shown) which compress the slotted narrow end of frame 11 around the CRT neck. In accordance with conventional practice, the frame is fashioned in the form of two mirror image members 15 and 16 joined to each other by means of tabs and recesses provided along their mating edge portions.

In order to horizontally deflect electron beams generated within the neck of the CRT, the deflection yoke 10, in a manner well known to those skilled in this art, is provided with a pair of opposed saddle-shaped deflection windings 17 and 18, best shown in FIG. 2. In order to accommodate the arcuate rearward edge of each saddle winding, the frame members may include enlarged portions 20 and 21, which together form a housing 22 into which the rearward edges 24 and 25 of the saddle coils extend, as illustrated in FIG. 2. Immediately to the rear of housing 22 are a pair of adjustable centering rings 26 and 27 which in a manner well known to those skilled in the art, provide adjustment of beam position.

In order to provide vertical deflection of the electron beam, deflection yoke 10 includes a vertical deflection winding indicated generally by reference numerals 28 and illustrated most clearly in FIGS. 2–3. Referring to these Figures, the deflection yoke assembly includes a frusto-conical ferrite core 30, coaxially aligned with frame 11, along the outer surface thereof. Core 30 is fashioned from a powdered ferrite material which is press-molded or slip-cast in a known manner to form a casting which is then fired in a kiln to form a rigid, mechanically rugged casting. During the firing process, the core 30 may shrink as much as 25%. Accordingly, it is necessary to cast the core somewhat oversize in order to achieve the desired dimension after firing.

In one embodiment, the deflection yoke includes a single or one piece core member which may completely encircle the neck of the CRT. Alternatively, and preferably, the yoke employs of pair of mating core halves or members each encircling one-half of the CRT neck which cooperatively join together to fully encircle the neck.

In order to facilitate installation of core 30 on frame 11, the core may be split along a plane passing through its linear axis to form two halves *30a* and *30b* as shown. A pair of spring clips 31 and 32 engage respective pairs of integrally formed halves *34a*, *34b* and *35a*, *35b* to clamp core halve *30a* and *30b* firmly together. The area where each tab joins the body of the core may be slightly undercut as shown to form a notch for more positive engagement of the spring clips.

In accordance with conventional practice, the electron beam generated with the CRT is vertically deflected by means of a magnetic field established by passing current through appropriate windings placed on the ferrite core. In the deflection yoke illustrated, such windings are provided in the form of a pair of opposed sets of windings 36 and 37 toroidally wound on diametrically opposed segments along the core opposite one another. In order to accurately maintain the desired position of the vertical deflection windings, core 30 in accordance with the preferred embodiment, is provided with a plurality of notches provided along its rearward edge. It being understood that rear edge is that edge facing away from the CRT screen.

Figure 7:
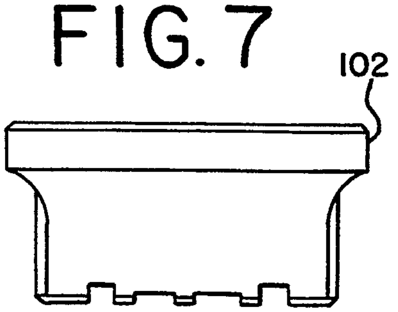
FIG. 7 is a side elevational view of a notched ferrite core in accordance with a preferred embodiment of the present invention.
Figure 8:
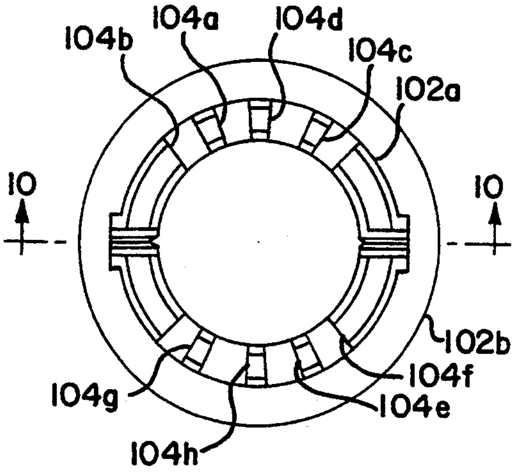
FIG. 8 is rear elevational view of the notched core shown in FIG. 7.

As shown in the drawings, the notches of a particular embodiment shown in FIGS. 7 through 10 are seen to be arranged in two diametrically opposed groups, each group comprising about four notches. While any number of notches can be provided, it has been found practically that a total of six notches gives the best performance in monochrome receivers, while a total of eight notches arranged in two groups of four each give the best performance in color receivers. As shown in FIGS. 7–8, the notches are generally rectangular in form and have a flat bottom which lies in a plane perpendicular to the longitudinal axis, X, of the core and sidewalls which are perpendicular to the bottom edge and aligned generally radially toward the center of the core for optimum control of winding location. As shown in FIG. 8 through FIG. 11, the outer notches *104a*, *104c*, *104d*, and **104*f* are preferably of greater depth than middle notches 104*b* and 104*e***, and widths of the outer notches are preferably less than the widths of the middle notches. Preferably, the notches are dimensioned so as to be of equal volume relative to the plane established by the rear edge of the core.

Vertical deflection windings 36 and 37 each comprise a plurality of serially connected windings each of which comprises a plurality of turns wound toroidally around the ferrite core 30. Each winding may or may not include sufficient turns to completely fill one of the notches, in accordance with the yoke inductance required. To avoid damaging the windings, the edges of the core over which the windings pass may be rounded or formed with a radius to thereby eliminate sharp edges.

Figure 4:
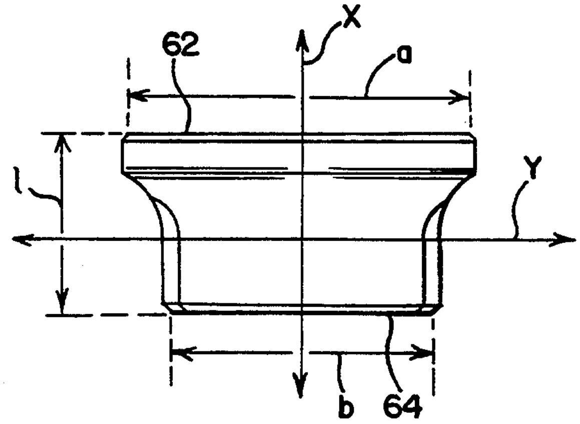
FIG. 4 is a side elevational view of an unnotched core.
Figure 6A:
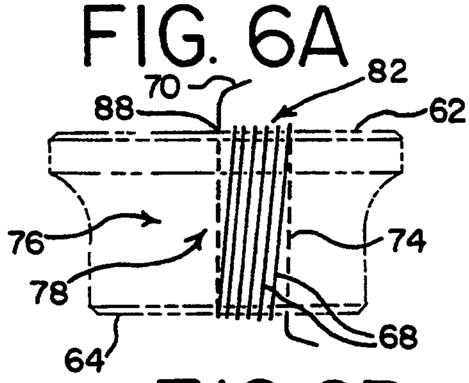
FIGS. 6A–6C are side elevational views of the unnotched core illustrating the winding sequence for providing the new and improved anti-ringing winding pattern in accordance with the present invention.
Figure 6B:
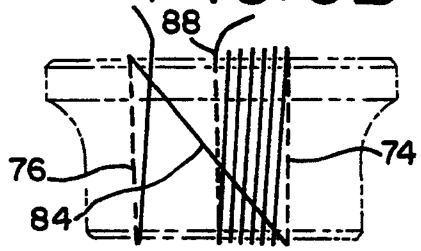
Figure 5:
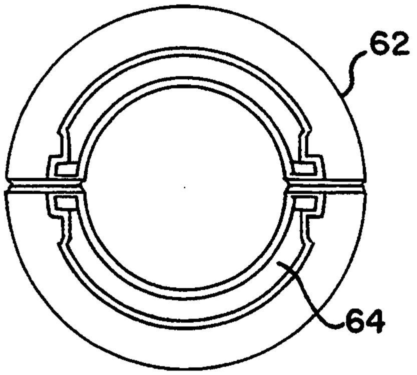
FIG. 5 is a rear elevational view of the unnotched core shown in FIG. 4.
Figure 6C:
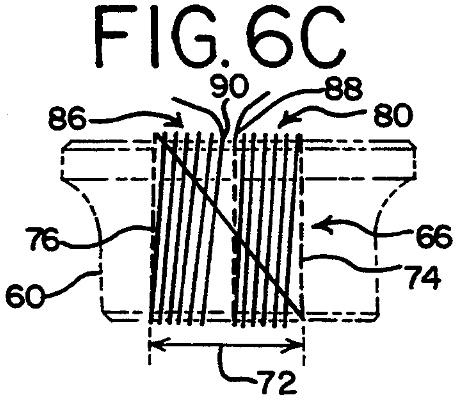

In greater detail now, and referring to FIGS. 4–6, the new and improved deflection yokes in accordance with this invention include a frusto-conical magnetic core member and at least one deflection winding on said core having a specific winding pattern. Referring to FIGS. 4–6C, the new and improved deflection yoke 10 in accordance with this invention, is shown. As depicted therein, deflection yoke 10 is for use with a cathode ray tube of the type in which an electron beam generated within the tube is magnetically deflected by a magnetic field of predetermined flux distribution. Deflection yoke 10 firstly comprises a hollow or tubular frustoconical magnetic core member 60. The diametrical dimension a, of the front end 62 is larger than diametrical dimension b, of rear end 64. Core member 60 has a central longitudinal axis, X, and a length dimension, 1, defined between the front end 62 and rear end 64. A circumferential winding axis, Y, is defined on core member 60 intermediate the length thereof and extending generally perpendicularly to said longitudinal axis, X.

The deflection yoke 10 additionally comprises at least one winding 66 electrically connectable to an applied deflection signal to produce a desired magnetic field for deflecting the electron beam in said cathode ray tube. The winding 66 comprises plural turns 68 of an electrically conductive wire 70 wound in a helical path about the winding axis, Y, of the core member 60. Each winding 66 extends along a curved portion of the circumference of the core member along a certain length of the winding axis, referred to as a segment 72. Each segment 72 includes a first end 74, an opposed second end 76 and a middle region 78 therebetween. Each deflection winding 66 in accordance with this invention is provided with a winding pattern 80 best shown in FIGS. 6A–6C which includes a first toroidally wound winding portion 82, an intermediate winding portion 84 and a second toroidally wound winding portion 86. First winding portion 82 extends from an intermediate starting point 88 located in middle region 78 along said winding axis, Y, in a first given hand of rotation, i.e., clockwise or counterclockwise, to the first end 74 of the segment 72. The intermediate winding portion traverses segment 72 from first end 74 to the second end 76 of segment 72, The second toroidally wound winding portion 86 extends from second end 76 to an intermediate end point 90 adjacent starting point 88. This winding pattern may be repeated by skipping over original starting point 88 to a new intermediate starting point and repeating the winding pattern until a desired number of total layers have been laid down one on top of the other between the first and second ends 74 and 76 defining the segment 72.

In the preferred embodiments, the second toroidally wound winding portion 86 is wound about the winding axis, Y, in the same hand or direction of rotation as was provided in the first toroidally wound winding portion 82. In an especially preferred embodiment, a total of seven layers of the complete winding pattern 80 is provided for each segment 72 defined on each core 60 to provide a good amount of resonance and non-ringing performance. The exact location of intermediate starting point 88 along middle region 78 is not critical as long as each winding starts in the middle proceeds to one end, crosses all the way over to the opposite end, is wound to the middle, skips a space and repeats. The number of turns of wire per winding pattern and per layer may vary depending on the inductance value required or desired.

In accordance with an alternate embodiment of the invention, a slotted deflection yoke 100 especially suited for use with color monitors and/or so-called FTM (flat television monitor) tubes is shown. Yoke 100 is similar to yoke 60 in many respects and comprises a ferrite core member 102 comprising a pair of symmetrical core halves **102*a*, 102*b*. In accordance with this preferred embodiment, four pairs of diametrically opposed notches 104*a*, 104*b*, 104*c*, 104*d*, 104*e*, 104*f*, 104*g*, and 104*h* are defined in rear end 106. Each of notches 104*a*–104*h*** is generally of a rectangular configuration having a flat bottom which extends parallel to winding axis, Y.

Figure 9A:
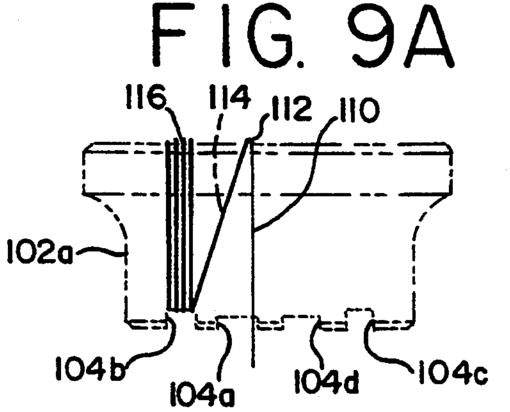
FIGS. 9A–9C are side elevational views of the notched core showing the winding sequence for providing the new and improved anti-ringing winding pattern thereon in accordance with this invention.
Figure 10:
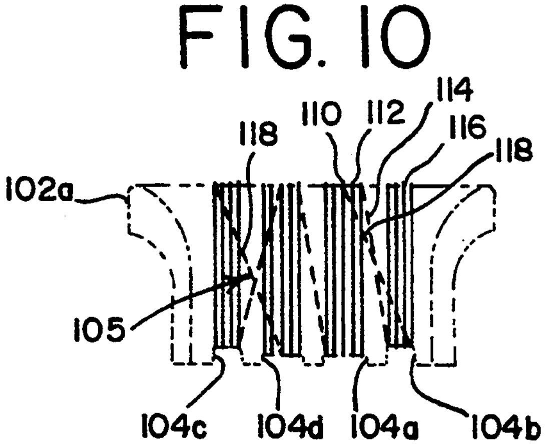
FIG. 10 is a rear side elevational view of the preferred deflection yoke in accordance with this invention showing the winding pattern of FIG. 9C as viewed from inside of the core member.
Figure 9B:
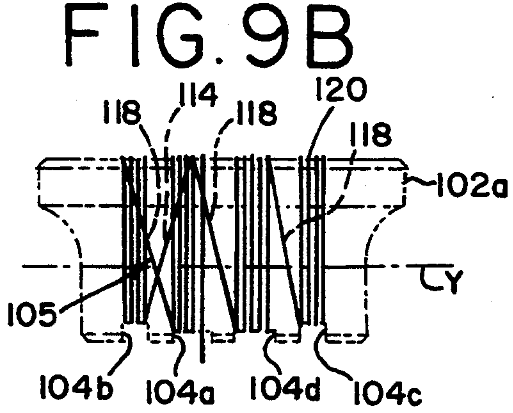
Figure 9C:
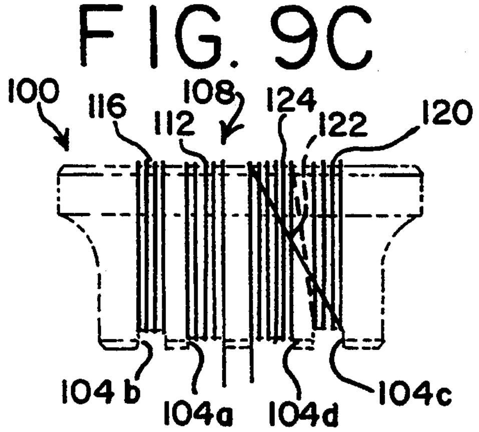
Figure 11:
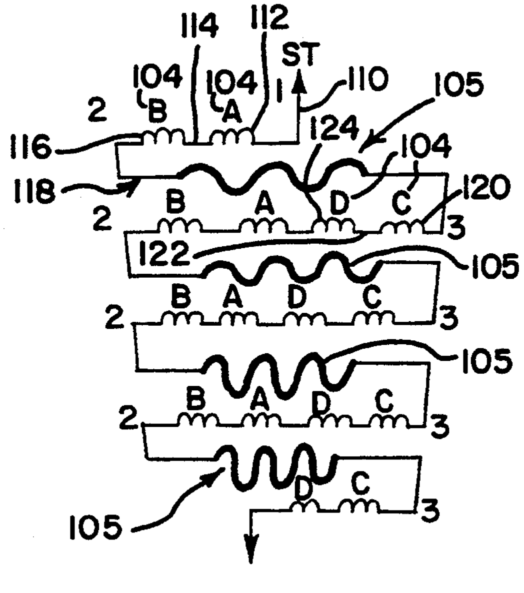
FIG. 11 is a schematic view illustrating the preferred winding pattern and sequence for making it in accordance with the preferred notched core embodiment shown in FIGS. 7–10.

In accordance with this preferred embodiment, the anti-ringing winding pattern 108 is provided as shown in FIGS. 9A–9C and 10–11. More particularly, winding pattern 108 begins at starting point 110 located at a middle portion of slot **104*a*. A first toroidally wound portion 112 extends from the starting point 110, leftward as shown in FIGS. 9A–9C, to the end of the slot 104*a*. A bridging transition portion 114 extends the wire from slot 104*a* to the right hand end of slot 104*b* as shown. A second toroidal winding portion 116 extends from right to left within slot 104*b*. A gradual transition portion 118 extends from the left end of slot 104*b* to the middle of slot 104*a*, to the middle of slot 104*d* and to the far right hand portion of slot 104*c* forming three slot crossovers 105 per layer as shown in FIGS. 9B and 10. A third toroidally wound winding portion 120 extends from the right to left in slot 104*c*. A bridging transition portion 122 extends the wire from the left side of slot 104*c* as shown to the right side of slot 104*d*. A fourth toroidally wound winding portion 124 extends from right to left in slot 104*d* to thereby fill all of the slots 104*a*–104*d*. The winding continues from right to left as shown, adding a second layer of toroidally wound windings to slots 104*a* and 104*b*. Once the rightmost end of slot 104*b* has been contacted, the winding traverses with a gradual serpentine woven portion to provide three crossovers 105 per layer again to return to the far right hand side of slot 104*c*. Another complete layer is wound in sequence from right to left, filling slots 104*c*, 104*d*, 104*a* and 104*b* in sequential order. After crossover back to the right hand portion of slot 104*c*, the deposition of winding layers is continued for as many layers as desired. The final most layer comprises a half width layer including toroidal windings for slots 104*c* and 104*d* with the winding terminating at about the left hand end of slot 104*d*, for connection to deflection signal circuitry. A summary of the preferred winding sequence is shown in FIG. 11. It should be noted that although three crossovers per layer are provided in the embodiment shown in FIGS. 7–11**, other sequences including fewer or more crossovers per layer, even zero crossovers per layer, in the transition from a first end to the second end may also be used.

In accordance with prior art yoke arrangements, attempts to eliminate ringing phenomena and problems nave included providing separate circuit elements electrically connected to the windings on the core. In contra-distinction with the prior art deflection yokes, the new and improved anti-ringing deflection yokes 60 and 100 do not require separate circuit elements to be added to reduce or eliminate ringing. The deflection yokes of this invention 60 and 100 may be electrically connected either in series or in parallel with other deflection circuit elements which provides better design flexibility. Moreover, the deflection yokes of this invention 60 and 100 are well suited for automated winding manufacturing and assembly techniques and methods, such as those described in the above-mentioned U.S. Pat. No. 4,754,248, the teachings of which are specifically incorporated herein by reference.

Although the present invention has been described with reference to certain preferred embodiments modifications or changes may be made therein by those skilled in this art. For example, instead of having three or four slots in each core half having a rectangular flat-bottomed cross-sectional configuration, fewer or more slots having other cross-sectional shapes may also be employed, such as slots having a convex bottom surface. Although deflection yokes for monochrome and a four slotted yoke for color monitors have been described, the anti-ringing winding patterns of this invention may also be used with other types of yokes and with any different numbers of winding segments including, for example, yokes for use with multi-gun color cathode ray tubes. All such obvious modifications or changes may be made herein by those skilled in this art without departing from the scope and spirit of the present invention as defined by the appended claims.

We claim:

1. A deflection yoke for use with a cathode ray tube of the type in which an electron beam generated within the tube is magnetically deflected by a magnetic field of predetermined flux distribution, comprising:

a frusto-conical magnetic core member including a front end and a opposed rear end, said front end having a diametrical dimension greater than the diametrical dimension of said rear end, said core member having a central longitudinal axis defined between said front end and said rear end and having a circumferentially winding axis defined thereon intermediate said front and rear ends and extending generally perpendicularly to said longitudinal axis;

at least one deflection winding on said core extending along a segment of said winding axis, said segment including a first end and an opposed second end, said deflection winding having a winding pattern including a first toroidally-wound winding portion, an intermediate portion and a second toroidally-wound winding portion, said first winding portion extending from an intermediate starting point along said segment in a given hand of rotation to said first segment end, said intermediate portion traversing said segment and extending from said first segment end to said second segment end, and said second winding portion extending from said second segment end to said intermediate starting point, said deflection winding being electrically interconnected for producing a magnetic field in response to an applied deflection signal for deflecting the electron beam; and said core member includes a pair of core halves having a plurality of diametrically opposed spaced and aligned pairs of slots defined in the rear ends thereof and said deflection winding has a starting point in a slot in a central location on each core half and said first and second toroidally wound winding portions include sections of toroidally wound windings disposed in said slots and transition sections including a length of winding wire extending from a first wound slot to an adjacent slot.

* * * * *